United States Patent
Ng et al.

(10) Patent No.: US 9,212,326 B2
(45) Date of Patent: Dec. 15, 2015

(54) HYDROHALOGENATION OF VINYL TERMINATED POLYMERS AND THEIR FUNCTIONALIZED DERIVATIVES FOR FOULING MITIGATION IN HYDROCARBON REFINING PROCESSES

(71) Applicants: ManKit Ng, Annandale, NJ (US); Donna J. Crowther, Seabrook, TX (US); Glen Barry Brons, Phillipsburg, NJ (US); Hong Cheng, Bridgewater, NJ (US); Patrick Brant, Seabrook, TX (US); Clarence Chase, Bensalem, PA (US)

(72) Inventors: ManKit Ng, Annandale, NJ (US); Donna J. Crowther, Seabrook, TX (US); Glen Barry Brons, Phillipsburg, NJ (US); Hong Cheng, Bridgewater, NJ (US); Patrick Brant, Seabrook, TX (US); Clarence Chase, Bensalem, PA (US)

(73) Assignee: EXXONMOBIL RESEARCH AND ENGINEERING COMPANY, Annandale, NJ (US)

(*) Notice: Subject to any disclaimer, the term of this patent is extended or adjusted under 35 U.S.C. 154(b) by 199 days.

(21) Appl. No.: 13/826,059

(22) Filed: Mar. 14, 2013

(65) Prior Publication Data
US 2014/0262950 A1  Sep. 18, 2014

(51) Int. Cl.
| | |
|---|---|
| C10G 75/04 | (2006.01) |
| C10L 1/2383 | (2006.01) |
| C10L 1/222 | (2006.01) |
| C10L 10/04 | (2006.01) |
| C10G 75/00 | (2006.01) |
| C08F 10/06 | (2006.01) |
| C08F 210/08 | (2006.01) |

(52) U.S. Cl.
CPC .............. *C10G 75/04* (2013.01); *C10L 1/2222* (2013.01); *C10L 1/2383* (2013.01); *C10L 10/04* (2013.01); *C08F 2810/40* (2013.01); *C10G 2300/4075* (2013.01); *C10G 2300/80* (2013.01)

(58) Field of Classification Search
CPC .............. C10G 75/04; C10G 2300/80; C10G 2300/4075; C08F 2810/40; C08F 210/08; C08F 210/06; C08F 8/20; C08F 10/06; C10L 1/2383; C10L 10/04
See application file for complete search history.

(56) References Cited

U.S. PATENT DOCUMENTS

| | | | |
|---|---|---|---|
| 3,454,555 A | 7/1969 | van der Voort et al. | |
| 3,565,804 A | * 2/1971 | Honnen et al. | ................. 508/259 |
| 3,898,056 A | * 8/1975 | Honnen | .......................... 44/432 |
| 4,368,133 A | 1/1983 | Forsberg | |

(Continued)

FOREIGN PATENT DOCUMENTS

| | | |
|---|---|---|
| GB | 1507379 A | 4/1978 |
| WO | 2008156806 A1 | 12/2008 |
| WO | 2011014215 A1 | 2/2011 |

OTHER PUBLICATIONS

Stevens, M.P. (1990). Polymer Chemistry an Introduction, $2^{nd}$ ed, Oxford University Press, 633 pgs [Office action cites pp. 19 and 82].*

(Continued)

*Primary Examiner* — Brian McCaig
(74) *Attorney, Agent, or Firm* — Glenn T. Barrett; Andrew T. Ward

(57) ABSTRACT

A compound useful for reducing fouling in a hydrocarbon refining process is provided. A method for preparing the compound includes hydrohalogenating a polymer having a vinyl chain end to obtain a halogen-containing terminal group, and reacting the terminal group with a polyamine. Methods of using the compound and compositions thereof are also provided.

5 Claims, 3 Drawing Sheets

(56) References Cited

U.S. PATENT DOCUMENTS

| | | |
|---|---|---|
| 5,777,041 A | 7/1998 | Emert et al. |
| 6,331,656 B1 | 12/2001 | Blankertz et al. |
| 8,063,232 B2 | 11/2011 | Hagadorn et al. |
| 8,283,419 B2 | 10/2012 | Hagadorn et al. |
| 8,372,930 B2 | 2/2013 | Brant et al. |
| 8,399,725 B2 | 3/2013 | Brant et al. |
| 2009/0318644 A1 | 12/2009 | Brant et al. |
| 2009/0318646 A1 | 12/2009 | Brant et al. |
| 2010/0038290 A1 | 2/2010 | Wang et al. |
| 2010/0170829 A1 | 7/2010 | Ng et al. |
| 2011/0147275 A1 | 6/2011 | Ng et al. |
| 2012/0245310 A1 | 9/2012 | Crowther et al. |
| 2012/0245311 A1 | 9/2012 | Crowther et al. |
| 2012/0245312 A1 | 9/2012 | Holtcamp et al. |
| 2012/0245313 A1 | 9/2012 | Crowther et al. |
| 2012/0309998 A1 | 12/2012 | Holtcamp et al. |

OTHER PUBLICATIONS

PCT Application No. PCT/US2014/017067, Communication from the Internatioal Searching Authority, Form PCT/ISA/220, dated May 9, 2014, 10 pages.

Kropp et al., "Surface-Mediated Reations. 1. Hydrohalogenation of Alkenes and Alkynes", Journal of the American Chemical Society, vol. 112, pp. 7433-7434 (1990).

Resconi et al., "Olefin Polymerization at Bis(Pentamethylcyclopentadienyl)Zircornium and -Hafnium Centers: Chain-Transfer Mechanisms", Journal of the American Chemical Society, vol. 114, pp. 1025-1032, (1992).

\* cited by examiner

HYDROHALOGENATION OF VINYL TERMINATED POLYMERS AND THEIR FUNCTIONALIZED DERIVATIVES FOR FOULING MITIGATION IN HYDROCARBON REFINING PROCESSES

STATEMENT OF RELATED CASES

This application relates to U.S. Provisional Application No. 61/704,743, filed on Sep. 24, 2012, the disclosure of which is incorporated by reference in its entirety herein.

TECHNICAL FIELD

The disclosed subject matter relates to additives to reduce fouling of crude hydrocarbon refinery components, and methods and systems using the same.

BACKGROUND

Petroleum refineries incur additional energy costs, perhaps billions per year, due to fouling and the resulting attendant inefficiencies caused by the fouling. More particularly, thermal processing of crude oils, blends and fractions in heat transfer equipment, such as heat exchangers, is hampered by the deposition of insoluble asphaltenes and other contaminants (i.e., particulates, salts, etc.) that may be found in crude oils. Further, the asphaltenes and other organics are known to thermally degrade to coke when exposed to high heater tube surface temperatures.

Fouling in heat exchangers receiving petroleum-type process streams can result from a number of mechanisms including chemical reactions, corrosion, deposit of existing insoluble impurities in the stream, and deposit of materials rendered insoluble by the temperature difference (ΔT) between the process stream and the heat exchanger wall. For example, naturally-occurring asphaltenes can precipitate from the crude oil process stream, thermally degrade to form a coke and adhere to the hot surfaces. Further, the high ΔT found in heat transfer operations result in high surface or skin temperatures when the process stream is introduced to the heater tube surfaces, which contributes to the precipitation of insoluble particulates. Another common cause of fouling is attributable to the presence of salts, particulates and impurities (e.g., inorganic contaminants) found in the crude oil stream. For example, iron oxide/sulfide, calcium carbonate, silica, sodium chloride and calcium chloride have all been found to attach directly to the surface of a fouled heater rod and throughout the coke deposit. These solids promote and/or enable additional fouling of crude oils.

The buildup of insoluble deposits in heat transfer equipment creates an unwanted insulating effect and reduces the heat transfer efficiency. Fouling also reduces the cross-sectional area of process equipment, which decreases flow rates and desired pressure differentials to provide less than optimal operation. To overcome these disadvantages, heat transfer equipment are ordinarily taken offline and cleaned mechanically or chemically cleaned, resulting in lost production time.

There is a need to reduce precipitation/adherence of particulates and asphaltenes from the heated surface to prevent fouling, particularly before the asphaltenes are thermally degraded or coked. Such reduction will improve the performance of the heat transfer equipment, decrease or eliminate scheduled outages for fouling mitigation efforts, and reduce energy costs associated with the processing activity.

Antifoulant additives have been described in a number of commonly-owned applications, including U.S. Patent Application Publication Nos. 20110147275 and 20100170829, the disclosure of each of which is incorporated herein by reference in its entirety. However, there remains a need for alternative antifoulant additives capable of reducing precipitation and/or adherence of particulates and asphaltenes.

SUMMARY

In accordance with one aspect of the disclosed subject matter, a compound is provided. The compound being represented by

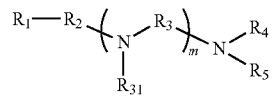

wherein $R_1$ is a branched or straight-chained $C_{10}$-$C_{800}$ alkyl or alkenyl group;
m is an integer between 0 and 10 inclusive;
$R_2$ is represented by

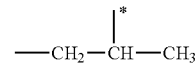

or —$CH_2$—$CH_2$—$CH_2$—*, wherein the asterisk (*) indicates a connecting point of $R_2$ with the nitrogen that connects with $R_3$;
$R_3$ is a $C_1$-$C_4$ branched or straight chained alkylene group;
$R_{31}$ is hydrogen or —$R_8$-$R_9$, wherein $R_8$ is defined the same as $R_2$ above, and $R_9$ is branched or straight-chained $C_{10}$-$C_{800}$ alkyl or alkenyl group, or $R_8$ and $R_9$ together are a $C_1$-$C_4$ branched or straight chained alkyl group optionally substituted with one or more amine groups;
and further wherein the —N($R_{31}$)—$R_3$— repeat unit is optionally interrupted in one or more places by a nitrogen-containing heterocyclic cycloalkyl group; and
$R_4$ and $R_5$ are each independently selected from (a) hydrogen, (b) —$R_6$-$R_7$, wherein $R_6$ is defined the same as $R_2$ above, and $R_7$ is a $C_{10}$-$C_{800}$ branched or straight chained alkyl or alkenyl group, or (c) a bond connected to $R_{31}$ in the m-th —N($R_{31}$)—$R_3$— repeat unit.

According to another aspect of the disclosed subject matter, a method for preparing a compound is provided. The method includes:
(a) converting a polymer base unit $R_{11}$ which is a branched or straight-chained $C_{10}$-$C_{800}$ alkyl or alkenyl group having a vinyl terminal group, to a polymer having a halogen terminal group;
(b) reacting the polymer having the halogen terminal group obtained in (a) with a polyamine represented by

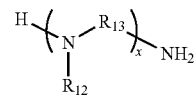

to form an amine hydrogen halide salt, wherein $R_{12}$ is hydrogen or a $C_1$-$C_4$ branched or straight chained alkyl optionally substituted with one or more amine groups, $R_{13}$ is a $C_1$-$C_4$ branched or straight chained alkylene group, and x is an integer between 1 and 10, and further wherein the —N($R_{12}$)—$R_{13}$— unit is optionally interrupted in one or more places by a nitrogen-containing heterocyclic cycloalkyl group, and wherein when the x-th —N($R_{12}$)—$R_{13}$-unit along with the terminal nitrogen atom forms a heterocyclic cycloalkyl group, the terminal —$NH_2$ is replaced by a —NH— group for valency; and (c) neutralizing the amine hydrogen halide salt with a base to liberate a free amine product.

According to a further aspect of the disclosed subject matter, a compound prepared by the above method is provided.

According to yet another aspect of the disclosed subject matter, a method for reducing fouling in a hydrocarbon refining process is provided. The method includes providing a crude hydrocarbon for a refining process; and adding an additive to the crude hydrocarbon, the additive being represented by:

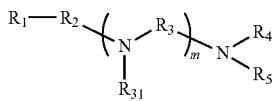

wherein $R_1$ is a branched or straight-chained $C_{10}$-$C_{800}$ alkyl or alkenyl group;

m is an integer between 0 and 10 inclusive;

$R_2$ is represented by

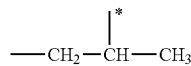

or —$CH_2$—$CH_2$—$CH_2$—*, wherein the asterisk (*) indicates a connecting point of $R_2$ with the nitrogen that connects with $R_3$;

$R_3$ is a $C_1$-$C_4$ branched or straight chained alkylene group;

$R_{31}$ is hydrogen or —$R_8$-$R_9$, wherein $R_8$ is defined the same as $R_2$ above, and $R_9$ is branched or straight-chained $C_{10}$-$C_{800}$ alkyl or alkenyl group, or $R_8$ and $R_9$ together are a $C_1$-$C_4$ branched or straight chained alkyl group optionally substituted with one or more amine groups;

and further wherein the —N($R_{31}$)—$R_3$— repeat unit is optionally interrupted in one or more places by a nitrogen-containing heterocyclic cycloalkyl group; and $R_4$ and $R_5$ are each independently selected from (a) hydrogen, (b) —$R_6$-$R_7$, wherein $R_6$ is defined the same as $R_2$ above, and $R_7$ is a $C_{10}$-$C_{800}$ branched or straight chained alkyl or alkenyl group, or (c) a bond connected to $R_{31}$ in the m-th —N($R_{31}$)—$R_3$— repeat unit.

In addition, the disclosed subject matter provides the additives as described in the above methods, antifouling compositions comprising such additives, and systems for refining hydrocarbons containing such additives and compositions.

BRIEF DESCRIPTION OF THE DRAWINGS

The disclosed subject matter will now be described in conjunction with the accompanying drawings in which.

DETAILED DESCRIPTION

Definitions

Figure 1:
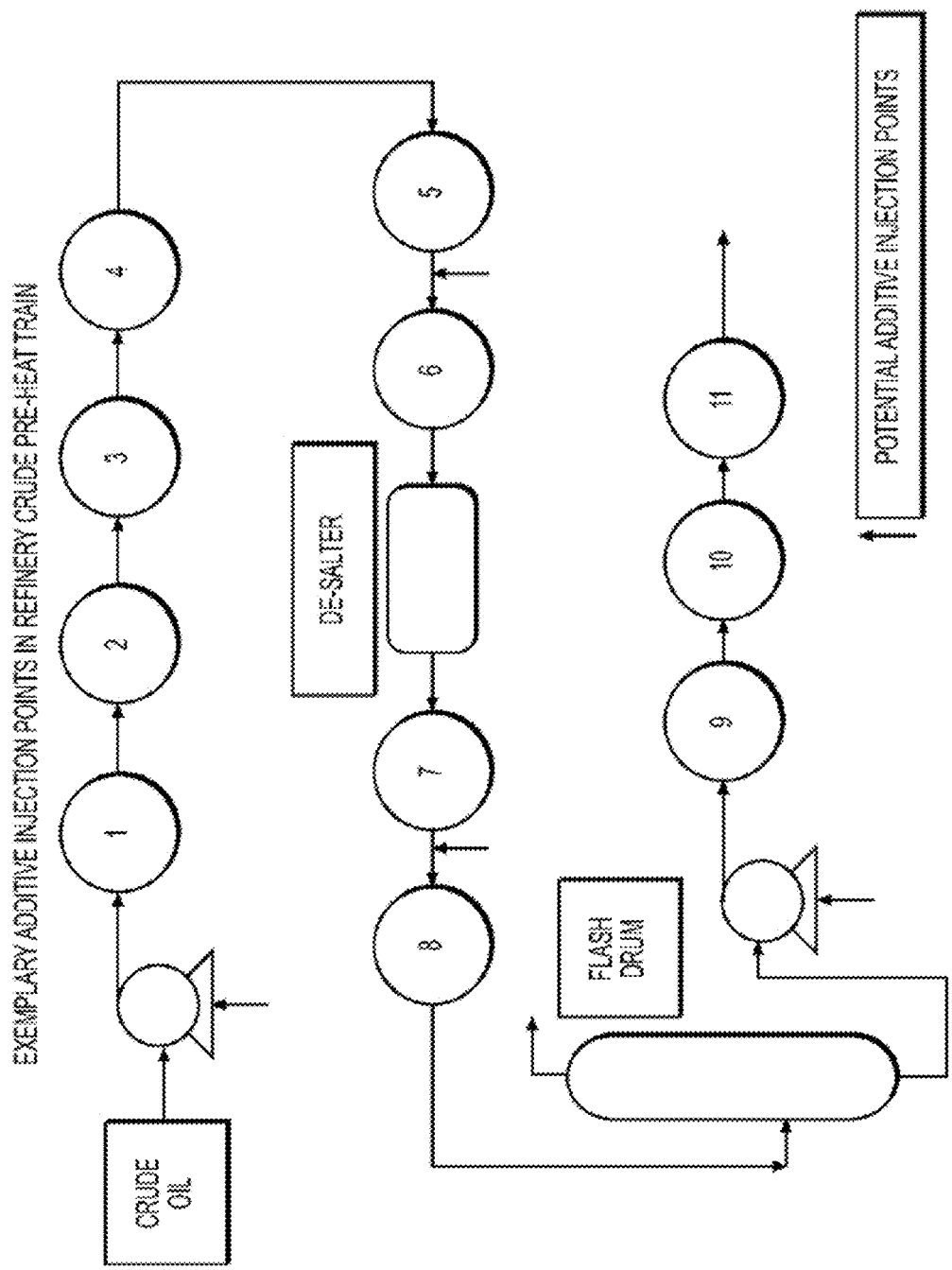
FIG. 1 is a representation of an oil refinery crude pre-heat train, annotated to show non-limiting injection points for the additives of the disclosed subject matter.

The following definitions are provided for purpose of illustration and not limitation.

As used herein, the term "fouling" generally refers to the accumulation of unwanted materials on the surfaces of processing equipment or the like, particularly processing equipment in a hydrocarbon refining process.

As used herein, the term "particulate-induced fouling" generally refers to fouling caused primarily by the presence of variable amounts of organic or inorganic particulates. Organic particulates (such as precipitated asphaltenes and coke particles) include, but are not limited to, insoluble matter precipitated out of solution upon changes in process conditions (e.g., temperature, pressure, or concentration changes) or a change in the composition of the feed stream (e.g., changes due to the occurrence of a chemical reaction). Inorganic particulates include, but are not limited to, silica, iron oxide, iron sulfide, alkaline earth metal oxide, sodium chloride, calcium chloride and other inorganic salts. One major source of these particulates results from incomplete solids removal during desalting and/or other particulate removing processes. Solids promote the fouling of crude oils and blends due to physical effects by modifying the surface area of heat transfer equipment, allowing for longer holdup times at wall temperatures and causing coke formation from asphaltenes and/or crude oil(s).

As used herein, the term "alkyl" refers to a monovalent hydrocarbon group containing no double or triple bonds and arranged in a branched or straight chain.

As used herein, the term "alkylene" refers to a divalent hydrocarbon group containing no double or triple bonds and arranged in a branched or straight chain.

As used herein, the term "alkenyl" refers to a monovalent hydrocarbon group containing one or more double bonds and arranged in a branched or straight chain.

As used herein, a "hydrocarbyl" group refers to any univalent radical that is derived from a hydrocarbon, including univalent alkyl, aryl and cycloalkyl groups.

As used herein, the term "crude hydrocarbon refinery component" generally refers to an apparatus or instrumentality of a process to refine crude hydrocarbons, such as an oil refinery process, which is, or can be, susceptible to fouling. Crude hydrocarbon refinery components include, but are not limited to, heat transfer components such as a heat exchanger, a furnace, a crude preheater, a coker preheater, or any other heaters, a FCC slurry bottom, a debutanizer exchanger/tower, other feed/effluent exchangers and furnace air preheaters in refinery facilities, flare compressor components in refinery facilities and steam cracker/reformer tubes in petrochemical facilities. Crude hydrocarbon refinery components can also include other instrumentalities in which heat transfer can take place, such as a fractionation or distillation column, a scrubber, a reactor, a liquid-jacketed tank, a pipestill, a coker and a visbreaker. It is understood that "crude hydrocarbon refinery components," as used herein, encompasses tubes, piping, baffles and other process transport mechanisms that are internal to, at least partially constitute, and/or are in direct fluid communication with, any one of the above-mentioned crude hydrocarbon refinery components.

As used herein, a reduction (or "reducing") particulate-induced fouling is generally achieved when the ability of particulates to adhere to heated equipment surfaces is reduced, thereby mitigating their impact on the promotion of the fouling of crude oil(s), blends, and other refinery process streams.

As used herein, reference to a group being a particular polymer (e.g., polypropylene or poly(ethylene-co-propylene) encompasses polymers that contain primarily the respective monomer along with negligible amounts of other substitutions and/or interruptions along polymer chain. In other words, reference to a group being a polypropylene group does not require that the group consist of 100% propylene monomers without any linking groups, substitutions, impurities or other substituents (e.g., alkylene or alkenylene substituents). Such impurities or other substituents can be present in relatively minor amounts so long as they do not affect the industrial performance of the additive, as compared to the same additive containing the respective polymer substituent with 100% purity.

For the purposes of the present application, when a polymer is referred to as comprising an olefin, the olefin present in the polymer is the polymerized form of the olefin.

As used herein, a copolymer is a polymer comprising at least two different monomer units (such as propylene and ethylene). A homo-polymer is a polymer comprising units of the same monomer (such as propylene). A propylene polymer is a polymer having at least 50 mole % of propylene.

The term "vinyl termination", also referred to as "allyl chain end(s)" or "vinyl content" is defined to be a polymer having at least one terminus represented by:

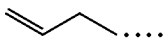

allylic vinyl end group where the "····" represents the polymer chain.

In a preferred embodiment the allyl chain end is represented by:

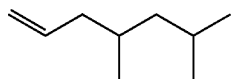

allylic vinyl end group

The amount of allyl chain ends (also called % vinyl termination) is determined using $^1$H NMR at 120° C. using deuterated tetrachloroethane as the solvent on a 500 MHz machine and in selected cases confirmed by $^{13}$C NMR. Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl terminated propylene polymers in J American Chemical Soc 114 1992, 1025-1032, hereby incorporated by reference in its entirety, that are useful herein.

"Isobutyl chain end" is defined to be a polymer having at least one terminus represented by:

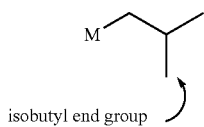

isobutyl end group where M represents the polymer chain. In an example embodiment, the isobutyl chain end is represented by one of the following formulae:

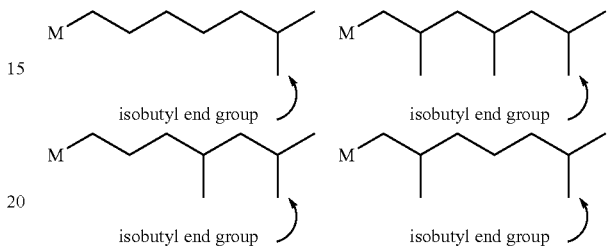

where M represents the polymer chain.

The "isobutyl chain end to allylic vinyl group ratio" is defined to be the ratio of the percentage of isobutyl chain ends to the percentage of allylic vinyl groups.

As used herein, the term "polymer" refers to a chain of monomers having a Mn of 100 g/mol and above.

Reference will now be made to various aspects of the disclosed subject matter in view of the definitions above.

In one aspect, the additives of the disclosed subject matter can interact with the materials in crude oils in a refinery or the like that are prone to cause fouling, e.g., particulate impurities/contaminants and asphaltenes. The interaction can be physical or chemical such as absorption, association, or chemical bonding. The fouling materials can be rendered more soluble in the crude oils as a result of interaction with the antifouling additives, therefore the fouling on the exchanger metal surfaces can be reduced or eliminated.

In accordance with one aspect of the disclosed subject matter, a compound (additive) is provided, represented by

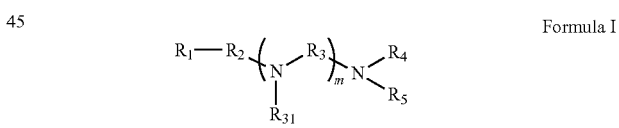

Formula I wherein $R_1$ is a branched or straight-chained $C_{10}$-$C_{800}$ alkyl or alkenyl group;
m is an integer between 0 and 10 inclusive;
$R_2$ is represented by

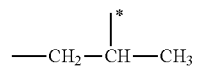

or —$CH_2$—$CH_2$—$CH_2$—*, wherein the asterisk (*) indicates a connecting point of $R_2$ with the nitrogen that connects with $R_3$;
$R_3$ is a $C_1$-$C_4$ branched or straight chained alkylene group;
$R_{31}$ is hydrogen or —$R_8$-$R_9$, wherein $R_8$ is defined the same as $R_2$ above, and $R_9$ is branched or straight-chained $C_{10}$-$C_{800}$ alkyl or alkenyl group, or $R_8$ and $R_9$ together are a $C_1$-$C_4$ branched or straight chained alkyl group optionally substituted with one or more amine groups;

and further wherein the —N($R_{31}$)—$R_3$— repeat unit is optionally interrupted in one or more places by a nitrogen-containing heterocyclic cycloalkyl group; and $R_4$ and $R_5$ are each independently selected from (a) hydrogen, (b) —$R_6$-$R_7$, wherein $R_6$ is defined the same as $R_2$ above, and $R_7$ is a $C_{10}$-$C_{800}$ branched or straight chained alkyl or alkenyl group, or (c) a bond connected to $R_{31}$ in the m-th —N($R_{31}$)—$R_3$— repeat unit.

In certain embodiments, at least one of $R_1$, $R_7$, and $R_9$ of the compound of Formula I shown above comprises polypropylene (PP), which can be atactic polypropylene or isotactic polypropylene. The polypropylene can be amorphous, and can include isotactic or syndiotactic crystallizable units. In some embodiments, the polypropylene includes meso diads constituting from about 30% to about 99.5% of the total diads of the polypropylene. In alternative embodiments, at least one of $R_1$, $R_7$, and $R_9$ of the compound of Formula I comprises polyethylene (PE).

In a further embodiment, at least one of $R_1$, $R_7$, and $R_9$ of the additive of Formula I comprises poly(ethylene-co-propylene) (EP). The mole percentage of the ethylene units and propylene units in the poly(ethylene-co-propylene) can vary. For example, in some embodiments, the poly(ethylene-co-propylene) can contain about 1 to about 90 mole % of ethylene units and about 99 to about 10 mole % propylene units. In other embodiments, the poly(ethylene-co-propylene) can contain about 10 to about 90 mole % of ethylene units and about 90 to about 10 mole % propylene units. In certain embodiments, the poly(ethylene-co-propylene) contains about 20 to about 50 mole % of ethylene units.

In some embodiments of the above method, at least one of $R_1$, $R_7$, and $R_9$ of the additive of Formula I has a number-averaged molecular weight of from about 300 to about 30,000 g/mol (assuming one olefin unsaturation per chain, as measured by $^1$H NMR). Alternatively, at least one of $R_1$, $R_7$, and $R_9$ of the additive of Formula I has a number-averaged molecular weight of from about 500 to 5,000 g/mol. In one embodiment, the PP or EP included in the $R_1$, $R_7$ or $R_9$ of the additive Formula I, individually, has a molecular weight from about 300 to about 30,000 g/mol, or from about 500 to about 5000 g/mol. In one embodiment, the PP or EP groups have a molecular weight, individually, ranging from about 500 to about 2500 g/mol, or a molecular of from about 500 to about 650 g/mol, or a molecular weight of from about 800 to about 1000 g/mol, or a molecular weight of from about 2000 to about 2500 g/mol.

In other embodiments of the compound, at least one of $R_1$, $R_7$, and $R_9$ comprises poly(higher alpha-olefin) or polypropylene-co-higher alpha-olefin), the higher alpha-olefin including two or more carbon atoms on each side chain. For example, suitable higher alpha-olefins can include, but are not limited to, 1-butene, 1-pentene, 1-hexene, 1-heptene, 1-octene, 1-nonene, 1-decene, 1-undecene, 1-dodecene, 1-tridecene, 1-tetradecene, 1-hexadecene, 1-octadecene and the like.

In certain embodiments of the above compound, the nitrogen content in the compound of Formula I is about 1 wt % to about 10 wt % based on the total weight of the compound.

In certain embodiments, $R_3$ is —$CH_2$—$CH_2$—, and $R_{31}$ is hydrogen. In these embodiments, the —N($R_{31}$)—$R_3$— repeat unit can be interrupted in one or more places by a 1,4-diethylenediamine.

In accordance with another aspect of the subject matter disclosed herein, a method is provided for preparing a compound (or additive), such as the compound described above. The method includes:

(a) converting a polymer base unit $R_{11}$ which is a branched or straight-chained $C_{10}$-$C_{800}$ alkyl or alkenyl group having a vinyl terminal group, to a polymer having a halogen terminal group;

(b) reacting the polymer having the halogen terminal group obtained in (a) with a polyamine represented by

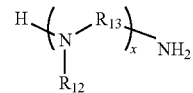

to form an amine hydrogen halide salt, wherein $R_{12}$ is hydrogen or a $C_1$-$C_4$ branched or straight chained alkyl optionally substituted with one or more amine groups, $R_{13}$ is a $C_1$-$C_4$ branched or straight chained alkylene group, and x is an integer between 1 and 10, and further wherein the —N($R_{12}$)—$R_{13}$— unit is optionally interrupted in one or more places by a nitrogen-containing heterocyclic cycloalkyl group, and wherein when the x-th —N($R_{12}$)—$R_{13}$-unit along with the terminal nitrogen atom forms a heterocyclic cycloalkyl group, the terminal —$NH_2$ is replaced by a —NH— group for valency; and (c) neutralizing the amine hydrogen halide salt with a base to liberate the free amine product.

In certain embodiments of the above method, the polymer base unit $R_{11}$ has a number-averaged molecular weight of 300 to 30,000 g/mol (assuming one olefin unsaturation per chain, as measured by $^1$H NMR), and alternatively, about 500 to 5,000 g/mol.

In some embodiments of the above method, the polymer base unit $R_{11}$ comprises polypropylene. The polypropylene can be either atactic polypropylene or isotactic polypropylene. The polypropylene can be amorphous, and can include isotactic or syndiotactic crystallizable units. In some embodiments, the polypropylene includes meso diads constituting from about 30% to about 99.5% of the total diads of the polypropylene. The polymer base unit $R_{11}$ can also comprise polyethylene.

In alternative embodiments, the polymer base unit $R_1$, comprises poly(ethylene-co-propylene). The poly(ethylene-co-propylene) can contain from about 1 or 10 mole % to about 90 or 99 mole % of ethylene units and from about 99 or 90 mole % to about 10 or 1 mole % propylene units. In one embodiment, the poly(ethylene-co-propylene) polymer contains from about 2 or 20 mole % to about 50 mole % ethylene units.

In one embodiment, the PP or EP included in the $R_{11}$ of the additive Formula I, individually, have a number-averaged molecular weight ($M_n$) molecular weight from about 300 to about 30,000 g/mol, or from about 500 to about 5000 g/mol (assuming one olefin unsaturation per chain, as measured by $^1$H NMR). In one embodiment, the PP or EP groups have a molecular weight, individually, ranging from about 500 to about 2500 g/mol, or a molecular of from about 500 to about 650 g/mol, or a molecular weight of from about 800 to about 1000 g/mol, or a molecular weight of from about 2000 to about 2500 g/mol.

In embodiments where the polymer base unit $R_{11}$, include polypropylene or poly(ethylene-co-propylene), such groups can be prepared, for example, by metallocene-catalyzed polymerization of propylene or a mixture of ethylene and propylene, which are then terminated with a high vinyl group content in the chain end. The number-averaged molecular weight ($M_n$) of the PP or EP can be from about 300 to about 30,000 g/mol, as determined by $^1$H NMR spectroscopy. The vinyl-terminated atactic or isotactic polypropylenes (v-PP) or vinyl-terminated poly(ethylene-co-propylene) (v-EP) suitable for further chemical functionalization can have a molecular weight ($M_n$) approximately from about 300 to about 30,000 g/mol, and preferably about 500 to 5,000 g/mol. The terminal olefin group can be a vinylidene group or an allylic vinyl group (both covered in Formula I). In certain embodiments, the terminal olefin group is an allylic vinyl group. In this regard, the terminal allylic vinyl group rich PP or EP as disclosed in U.S. Pat. No. 8,372,930 and co-pending application, U.S. Patent Application Publication No. 20090318646, can be used, each of which is hereby incorporated by reference in its entirety. Some of the vinyl terminated EP or PP according to these co-pending applications contains more than 90% of allylic terminal vinyl group.

In some embodiments of the above method, $R_{11}$, can comprise propylene and less than 0.5 wt % comonomer, preferably 0 wt % comonomer, wherein the $R_{11}$, has:
i) at least 93% allyl chain ends (preferably at least 95%, preferably at least 97%, preferably at least 98%);
ii) a number average molecular weight (Mn) of about 500 to about 20,000 g/mol, as measured by $^1$H NMR, assuming one olefin unsaturation per chain (preferably 500 to 15,000, preferably 700 to 10,000, preferably 800 to 8,000 g/mol, preferably 900 to 7,000, preferably 1000 to 6,000, preferably 1000 to 5,000);
iii) an isobutyl chain end to allylic vinyl group ratio of 0.8:1 to 1.3:1.0;
iv) less than 1400 ppm aluminum, (preferably less than 1200 ppm, preferably less than 1000 ppm, preferably less than 500 ppm, preferably less than 100 ppm).

In some embodiments of the above method, $R_{11}$ can comprise a propylene copolymer having an Mn of 300 to 30,000 g/mol as measured by $^1$H NMR and assuming one olefin unsaturation per chain (preferably 400 to 20,000, preferably 500 to 15,000, preferably 600 to 12,000, preferably 800 to 10,000, preferably 900 to 8,000, preferably 900 to 7,000 g/mol), comprising 10 to 90 mol % propylene (preferably 15 to 85 mol %, preferably 20 to 80 mol %, preferably 30 to 75 mol %, preferably 50 to 90 mol %) and 10 to 90 mol % (preferably 85 to 15 mol %, preferably 20 to 80 mol %, preferably 25 to 70 mol %, preferably 10 to 50 mol %) of one or more alpha-olefin comonomers (preferably ethylene, butene, hexene, or octene, or decene, preferably ethylene), wherein the polymer has at least X % allyl chain ends (relative to total unsaturations), where X is 80% or more, preferably 85% or more, preferably 90% or more, preferably 95% or more. Alternatively, $R_{11}$ can have at least 80% isobutyl chain ends (based upon the sum of isobutyl and n-propyl saturated chain ends), preferably at least 85% isobutyl chain ends, preferably at least 90% isobutyl chain ends. Alternately, $R_{11}$ can have an isobutyl chain end to allylic vinyl group ratio of 0.8:1 to 1.35:1.0, preferably 0.9:1 to 1.20:1.0, preferably 0.9:1.0 to 1.1:1.0.

In other embodiments, $R_{11}$ can comprise a polypropylene copolymer having more than 90 mol % propylene (preferably 95 to 99 mol %, preferably 98 to 9 mol %) and less than 10 mol % ethylene (preferably 1 to 4 mol %, preferably 1 to 2 mol %), wherein the copolymer has:
at least 93% allyl chain ends (preferably at least 95%, preferably at least 97%, preferably at least 98%);
a number average molecular weight (Mn) of about 400 to about 30,000 g/mol, as measured by $^1$H NMR and assuming one olefin unsaturation per chain (preferably 500 to 20,000, preferably 600 to 15,000, preferably 700 to 10,000 g/mol, preferably 800 to 9,000, preferably 900 to 8,000, preferably 1000 to 6,000);
an isobutyl chain end to allylic vinyl group ratio of 0.8:1 to 1.35:1.0, and
less than 1400 ppm aluminum, (preferably less than 1200 ppm, preferably less than 1000 ppm, preferably less than 500 ppm, preferably less than 100 ppm).

In alternative embodiments, $R_{11}$, can comprise a polypropylene copolymer comprising:
at least 50 (preferably 60 to 90, preferably 70 to 90) mol % propylene and from 10 to 50 (preferably 10 to 40, preferably 10 to 30) mol % ethylene, wherein the polymer has:
at least 90% allyl chain ends (preferably at least 91%, preferably at least 93%, preferably at least 95%, preferably at least 98%);
an Mn of about 150 to about 20,000 g/mol, as measured by $^1$H NMR and assuming one olefin unsaturation per chain (preferably 200 to 15,000, preferably 250 to 15,000, preferably 300 to 10,000, preferably 400 to 9,500, preferably 500 to 9,000, preferably 750 to 9,000); and
an isobutyl chain end to allylic vinyl group ratio of 0.8:1 to 1.3:1.0, wherein monomers having four or more carbon atoms are present at from 0 to 3 mol % (preferably at less than 1 mol %, preferably less than 0.5 mol %, preferably at 0 mol %).

In further embodiments, $R_{11}$ can comprise a polypropylene copolymer comprising:
at least 50 (preferably at least 60, preferably 70 to 99.5, preferably 80 to 99, preferably 90 to 98.5) mol % propylene, from 0.1 to 45 (preferably at least 35, preferably 0.5 to 30, preferably 1 to 20, preferably 1.5 to 10) mol % ethylene, and from 0.1 to 5 (preferably 0.5 to 3, preferably 0.5 to 1) mol % $C_4$ to $C_{12}$ olefin (such as butene, hexene or octene, or decene, preferably butene), wherein the polymer has:
at least 90% allyl chain ends (preferably at least 91%, preferably at least 93%, preferably at least 95%, preferably at least 98%);
a number average molecular weight (Mn) of about 150 to about 15,000 g/mol, as measured by $^1$H NMR and assuming one olefin unsaturation per chain (preferably 200 to 12,000, preferably 250 to 10,000, preferably 300 to 10,000, preferably 400 to 9500, preferably 500 to 9,000, preferably 750 to 9,000); and
an isobutyl chain end to allylic vinyl group ratio of 0.8:1 to 1.35:1.0.

In certain embodiments, $R_{11}$ can comprise a polypropylene copolymer comprising:
at least 50 (preferably at least 60, preferably 70 to 99.5, preferably 80 to 99, preferably 90 to 98.5) mol % propylene, from 0.1 to 45 (preferably at least 35, preferably 0.5 to 30, preferably 1 to 20, preferably 1.5 to 10) mol % ethylene, and from 0.1 to 5 (preferably 0.5 to 3, preferably 0.5 to 1) mol % diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the polymer has:
at least 90% allyl chain ends (preferably at least 91%, preferably at least 93%, preferably at least 95%, preferably at least 98%);
a number average molecular weight (Mn) of about 150 to about 20,000 g/mol, as measured by $^1$H NMR and assuming one olefin unsaturation per chain (preferably 200 to 15,000, preferably 250 to 12,000, preferably 300 to 10,000, preferably 400 to 9,500, preferably 500 to 9,000, preferably 750 to 9,000); and an isobutyl chain end to allylic vinyl group ratio of 0.7:1 to 1.35:1.0.

In other embodiments of the method, $R_{11}$ can comprises poly(higher alpha-olefin) or polypropylene-co-higher alpha-olefin), the higher alpha-olefin including two or more carbon atoms on each side chain. For example, suitable higher alpha-olefins can include, but are not limited to, 1-butene, 1-pentene, 1-hexene, 1-heptene, 1-octene, 1-nonene, 1-decene, 1-undecene, 1-dodecene, 1-tridecene, 1-tetradecene, 1-hexadecene, 1-octadecene and the like.

In certain embodiments, $R_{11}$ includes those vinyl terminated macromonomers disclosed in U.S. Patent Application Publication Nos. 20120245312, 20120245310, 20120245311, 20120245313, and U.S. Provisional Application No. 61/704,604, the disclosure of each of which is incorporated by reference in its entirety herein.

In the above method of preparation, for the reaction of converting a polymer base unit $R_{11}$ having a terminal vinyl functionality, a reaction called hydrohalogenation can be employed. The reactant used in the reaction can be a hydrogen halide, for example, hydrogen chloride, hydrogen bromide, hydrogen iodide, or hydrogen fluoride. Due to the highly corrosive nature of hydrogen fluoride gas, in those embodiments where hydrogen fluoride is used, the reaction can be carried out using pyridine poly(hydrogen fluoride) or poly(4-vinylpyridinium poly(hydrogen fluoride) for ease of handling.

Using hydrogen bromide as an example, the terminal vinyl functionality of the polymer base unit $R_{11}$ can be hydrobrominated to provide a bromine-containing polymer in high yield, chemical purity and regioselectivity. In the bromination reactions, addition of the hydrogen bromide (HBr) molecule across the double bond of the vinyl group at the chain end can take place predominantly in the so-called anti-Markovnikov fashion (i.e., the bromine atom is added to the terminal carbon of the vinyl group and the hydrogen to the adjacent internal carbon), resulting in the formation of a primary bromide (—$CH_2$—Br) structure at the chain end of the polymer. As a general example, the hydrobromination of a vinyl-terminated polypropylene (PP), ethylene-propylene (EP), or propylene-higher alpha-olefin copolymer is illustrated in Scheme 1 below.

As is well-known in organic chemistry, the primary bromide structure tends to give higher proportion of bimolecular nucleophilic substitution ($S_N2$) product(s) relative to elimination (E1 or E2) product(s) when compared to an analogous secondary bromide structure. The hydrobromination functionalization method as applied to vinyl terminated polymers can afford 1-bromo polymer in high regioselectivity, which may be attributed to the peroxide effect. Without wishing to be bound by any particular theory, the source of peroxide is believed to be the result of exposure of the polymer material to open atmosphere leading to the formation of trace amount of peroxide in the material. No additional peroxide radical initiator is needed for the reaction to follow a radical addition mechanism. Optionally, any well-known radical initiator may be used in the hydrobromination. It is also understood that an ionic mechanism would lead to the 2-bromo regioisomer via the intermediacy of a secondary carbocation. In other words, if the 2-bromo regioisomer is the desired product, the vinyl terminated polymer starting materials and hydrogen bromide reagent can be rigorously purified to eliminate traces of peroxide species. Alternatively, hydrobromic acid or in situ generated HBr (for example, from the reaction of trimethylsilyl bromide with $SiO_2$ or $Al_2O_3$ surfaces, see Kropp Paul J. et al J. Am. Chem. Soc. 1990, 112, 7433-7434) can be used for the preparation of bromo alkane with Markovnikov regioselectivity.

In certain embodiments, the hydrohalogenation reaction involves contacting a vinyl terminated polymer base unit with a hydrohalogenating agent. The reactants can be combined in a reaction vessel at a temperature of −50° C. to 300° C. (e.g., 25° C., or 150° C.). Likewise the reactants can be combined at a pressure of 0 to 1000 MPa (e.g., 0.5 to 500 MPa, or 1 to 250 MPa) for a residence time of 0.5 seconds to 10 hours (e.g., 1 second to 5 hours, or 1 minute to 1 hour). For example, from about 0.5 to about 1.0 moles or a slight excess of the hydrohalogenation reagent can be charged to the reactor per mole of polymer base unit charged.

Hydrohalogenating reagents can include those known to those having ordinary skill in the art and include HBr, HCl, HI, HF, and the like. They can be dissolved in another acid, such as acetic acid. For example, hydrobromic acid can be prepared in water (48% HBr in water). Hydrogen fluoride-

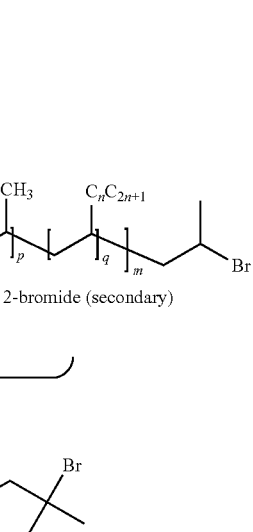

boron trifluoride etherate (HF—OEt$_2$.BF$_3$) can be prepared in ether. Gaseous hydrogen bromide can be generated from metal bromide salts and strong acid such as NaBr+concentrated H$_2$SO$_4$. Hydrogen chloride can be available as hydrochloric acid, gas, in 1,4-dioxane, acetic acid, diethyl ether, methanol, ethanol, 2-propanol, or 1-butanol from Sigma Aldrich Co. and other commercial suppliers.

Other conditions and operating parameters of the hydrohalogenation reaction include those disclosed in U.S. Provisional Application No. 61/704,743, the disclosure of which is incorporated by reference in its entirety herein.

As previously noted, the method of preparing the compound can include reacting the polymer obtained above with a polyamine (PAM). The reaction can be through nucleophilic substitution in the presence of a base (e.g., sodium hydroxide for neutralization of hydrogen bromide by-product). The polyamine can include linear, branched or cyclic isomers of an oligomer of ethyleneamine, or mixtures thereof, wherein each two neighboring nitrogens in the oligomer of ethyleneamine are bridged by one or two ethyleneamine groups. For example, the polyamine can be selected from polyethyleneimines with general molecular formula H$_2$N(CH$_2$CH$_2$NH)$_x$H (where x=1, 2, 3, . . . ) such as ethylenediamine, diethylenetriamine, triethylenetetramine, tetraethylenepentamine, pentaethylenehexamine, hexaethyleneheptamine, and mixtures thereof. In some embodiments, the polyamine can comprise a heavy polyamine, such as polyethyleneamine heavy bottoms available from Dow Chemical as "Heavy Polyamine X" or HPA-X which has about 6.5 nitrogen atoms per molecule on average.

For example and as embodied herein, the reaction can include reacting a hydrobrominated polymer (as illustrated by the product obtained from Scheme 1) with a polyamine (tetraethylenepentamine is used as an example) to provide the compound as depicted in Scheme 2 below.

with the polyalkyl bromide. Suitable inorganic bases include sodium hydroxide, potassium hydroxide, sodium carbonate and potassium carbonate, sodium hydride and potassium hydride.

In certain embodiments, the organic or inorganic base is added at the same time the polyalkyl bromide and polyamine are introduced. Alternatively the base can be added after the nucleophilic substitution reaction has occurred. These procedures will be known to one of ordinary skill in the art.

The reaction between polyalkyl bromide and polyamine can be conducted at a temperature between room temperature and 160° C. In certain embodiments, the reaction is conducted at a temperature between 80° C. to 100° C. In additional embodiments, the reaction is conducted at a temperature between 100° C. and 120° C. In still further embodiments, the reaction is conducted at a temperature between 120° C. and 140° C. The polyalkyl bromide and the polyamine can be dissolved in inert solvent or provided neat.

In some embodiments, a catalyst is provided to increase the rate of reaction. Suitable catalysts include, for example, iodide salts such as potassium iodide, sodium iodide, and tetrabutylammonium iodide.

In certain embodiments of the disclosed subject matter, the reaction is carried out under phase transfer catalysis conditions, wherein an aqueous phase and an organic phase are present and a phase transfer catalyst is provided. Suitable solvents include but are not limited to ethers, including tetrahydrofuran, paraffins, including hexane, heptane, octane, cyclohexane, and methylcyclohexane, aromatics, including benzene, toluene and xylenes, alcohols, esters, nitriles, polar aprotic solvents, including N,N-dimethylformamide, N,N-dimethylacetamide, N,N-dimethylsulfoxide, and 1-methyl-2-pyrrolidinone, or a mixture of any of the solvents above in any ratio.

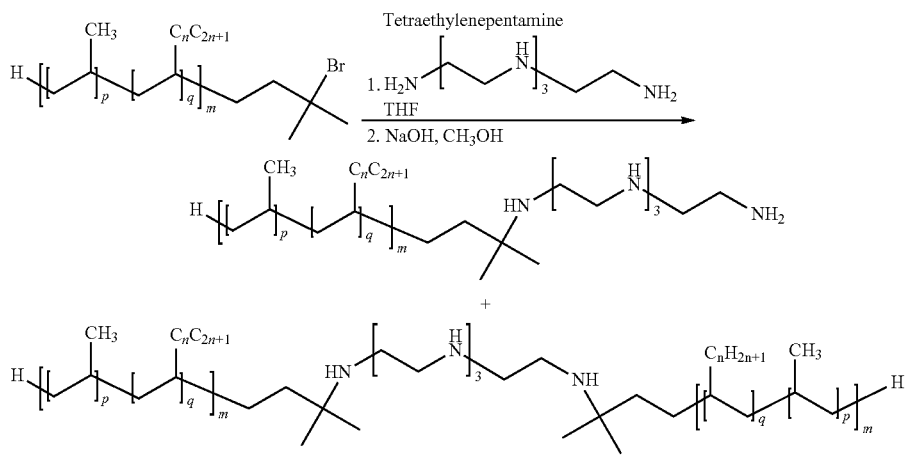

Scheme 2

A base can be used with the reaction of the hydrohalogenated polymer and the polyamine to neutralize the amine hydrogen bromide salt formed during the reaction to liberate the free amine product additive. Either organic or inorganic bases can be used. Suitable organic bases include but are not limited to tertiary amines such as triethylamine and N,N-diisopropylethylamine. Alternatively, a primary or secondary amine may be used to absorb the hydrogen bromide provided that the polyamine compound of interest has already reacted The charge molar ratio of the hydrobrominated polymer with the PAM can be from 20:1 to 1:20, and in some embodiments, 5:1 to 1:1, depending on the product sought.

As illustrated in the example above, the number of polymer chain attached to each polyamine molecule can vary from one to two to three or more. In addition, both primary and secondary amino groups on the polyamine can participate in the reaction with the hydrobrominated polymer. Other commercially available lower or higher polyamines with linear, branched, cyclic or heterocyclic structures can also be used. It is well-known and understood by those skilled in the art that these polyamines can be mixtures of compounds comprised of molecules with a distribution of chain lengths, different level and type of amine (primary, secondary, and tertiary) functional groups, and varying degree of linear, branched and cyclic structures. For example, possible isomers for tetraethylenepentamine include the following:

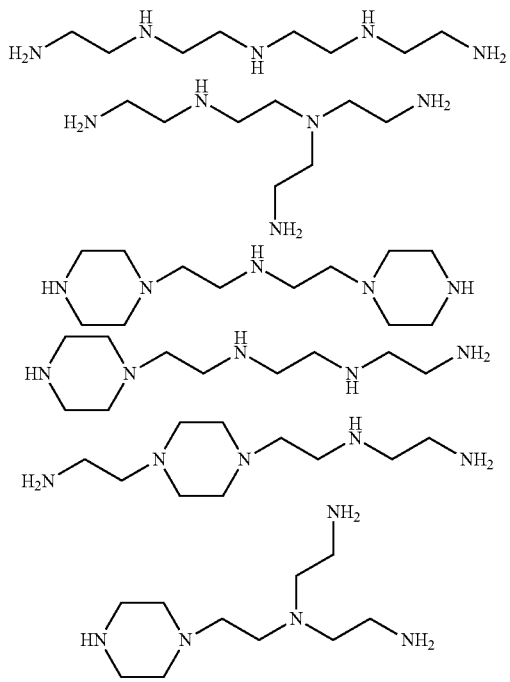

As the molecular weight of polyamines increases, the number of possible isomers increases as well.

In another aspect of the disclosed subject matter, a compound (additive) is prepared by the method discussed above and various embodiments thereof.

In another aspect, a method for reducing fouling in a hydrocarbon refining process is provided, which comprises providing a crude hydrocarbon for a refining process, and adding to the crude hydrocarbon an additive of Formula I or various embodiments thereof as described above (e.g., at standard operation conditions).

Another aspect of the disclosed subject matter provides a system for refining hydrocarbons that includes at least one crude hydrocarbon refinery component, in which the crude hydrocarbon refinery component includes an additive selected from any one of the additives described herein. The crude hydrocarbon refining component can be selected from a heat exchanger, a furnace, a crude preheater, a coker preheater, a FCC slurry bottom, a debutanizer exchanger, a debutanizer tower, a feed/effluent exchanger, a furnace air preheater, a flare compressor component, a steam cracker, a steam reformer, a distillation column, a fractionation column, a scrubber, a reactor, a liquid-jacketed tank, a pipestill, a coker, and a visbreaker. For example, the crude hydrocarbon refining component can be a heat exchanger (e.g., a crude pre-heat train heat exchanger). Such methods and systems are described in greater details in the following sections and examples.

Another aspect of the disclosed subject matter provides a composition for reducing fouling that includes at least one of any of the above-described additives, and a boronating agent. The boronating agent can be any one or more compounds selected from boric acid, an ortho-borate, or a meta-borate, for example, boric acid, trimethyl metaborate (trimethoxyboroxin), triethyl metaborate, tributyl metaborate, trimethyl borate, triethylborate, triisopropyl borate (triisopropoxyborane), tributyl borate (tributoxyborane) and tri-t-butyl borate. Other boronating agents can be used, such as those disclosed in co-pending applications US20100038290 and US20100170829, each incorporated by reference herein in its entirety.

Further Compositions for Reducing Fouling

The additives of the disclosed subject matter can be used in compositions that prevent fouling, including particulate-induced fouling. In addition to the additives of the disclosed subject matter, the compositions can further contain a hydrophobic oil solubilizer for the additive and/or a dispersant for the additive.

Suitable solubilizers can include, for example, surfactants, carboxylic acid solubilizers, such as the nitrogen-containing phosphorous-free carboxylic solubilizers disclosed in U.S. Pat. No. 4,368,133, hereby incorporated by reference in its entirety.

Also as disclosed in U.S. Pat. No. 4,368,133, hereby incorporated by reference in its entirety, surfactants that can be included in compositions of the disclosed subject matter can include, for example, cationic, anionic, nonionic or amphoteric type of surfactant. See, for example, McCutcheon's "Detergents and Emulsifiers", 1978, North American Edition, published by McCutcheon's Division, MC Publishing Corporation, Glen Rock, N.J., U.S.A., including pages 17-33, which is hereby incorporated by reference in its entirety.

The compositions of the disclosed subject matter can further include, for example, viscosity index improvers, anti-foamants, antiwear agents, demulsifiers, anti-oxidants, and other corrosion inhibitors.

Furthermore, the additives of the disclosed subject matter can be added with other compatible components that address other problems that can present themselves in an oil refining process known to one of ordinary skill in the art.

Uses of the Additives and Compositions in a Refinery Process

The additives of the disclosed subject matter are generally soluble in a typical hydrocarbon refinery stream and can thus be added directly to the process stream, alone or in combination with other additives that either reduce fouling or improve some other process parameter.

The additives can be introduced, for example, upstream from the particular crude hydrocarbon refinery component(s) (e.g., a heat exchanger) in which it is desired to prevent fouling (e.g. particulate-induced fouling). Alternatively, the additive can be added to the crude oil prior to being introduced to the refining process, or at the very beginning of the refining process.

It is noted that water can have a negative impact on boron-containing additives. Accordingly, it is advisable to add boron-containing additives at process locations that have a minimal amount of water.

While not limited thereto, the additives of the disclosed subject matter are particularly suitable in reducing or preventing particulate-induced fouling. Thus one aspect of the disclosed subject matter provides a method of reducing and/or preventing, in particular, particulate-induced fouling that includes adding at least one additive of the disclosed subject matter to a process stream that is known, or believed to contribute to, particulate-induced fouling. To facilitate determination of proper injection points, measurements can be taken to ascertain the particulate level in the process stream.

Thus, one embodiment of the disclosed subject matter includes identifying particular areas of a refining process that have relatively high particulate levels, and adding any one of the additives of the disclosed subject matter in close proximity to these areas (e.g., just upstream to the area identified as having high particulate levels).

In some embodiments of the disclosed subject matter, a method to reduce fouling is provided comprising adding any one of the above-mentioned additives or compositions to a crude hydrocarbon refinery component that is in fluid communication with a process stream that contains, at least 50 wppm of particulates, including organic and inorganic particulates. In another embodiment of the disclosed subject matter, a method to reduce fouling is provided comprising adding any one of the above-mentioned antifouling additives or compositions to a crude hydrocarbon refinery component that is in fluid communication with a process stream. In another embodiment of the disclosed subject matter, a method to reduce fouling is provided comprising adding any one of the above-mentioned additives to a crude hydrocarbon refinery component that is in fluid communication with a process stream that contains at least 250 wppm (or 1000 wppm, or 10,000 wppm) of particulates, including organic and inorganic particulates, as defined above.

In some embodiments of the disclosed subject matter, the additives or compositions of the disclosed subject matter are added to selected crude oil process streams known to contain, or possibly contain, problematic amounts of organic or inorganic particulate matter (e.g. 1-10,000 wppm), such as inorganic salts. Accordingly, the additives of the disclosed subject matter can be introduced far upstream, where the stream is relatively unrefined (e.g. the refinery crude pre-heat train). The additives can be also added, for example, after the desalter to counteract the effects of incomplete salt removal or to the bottoms exit stream from the fractionation column to counteract the high temperatures that are conducive to fouling.

FIG. 1 demonstrates possible additive injection points within the refinery crude pre-heat train for the additives of the disclosed subject matter, wherein the numbered circles represent heat exchangers. As shown in FIG. 1, the additives can be introduced in crude storage tanks and at several locations in the preheat train. This includes at the crude charge pump (at the very beginning of the crude pre-heat train), and/or before and after the desalter, and/or to the bottoms stream from a flash drum.

The total amount of additive to be added to the process stream can be determined by a person of ordinary skill in the art. In one embodiment, up to about 1000 wppm of additive is added to the process stream. For example, the additive can be added such that its concentration, upon addition, is about 50 ppm, 250 ppm or 500 ppm. More or less additive can be added depending on, for example, the amount of particulate in the stream, the ΔT associated with the particular process and the degree of fouling reduction desired in view of the cost of the additive.

The additives or compositions of the disclosed subject matter can be added in a solid (e.g. powder or granules) or liquid form directly to the process stream. As mentioned above, the additives or compositions can be added alone, or combined with other components to form a composition for reducing fouling (e.g. particulate-induced fouling). Any suitable technique can be used for adding the additive to the process stream, as known by a person of ordinary skill in the art in view of the process to which it is employed. As a non-limiting example, the additives or compositions can be introduced via injection that allows for sufficient mixing of the additive and the process stream.

EXAMPLES

The disclosed subject matter is further described by means of the examples, presented below. The use of such examples is illustrative only and in no way limits the scope and meaning of the disclosed subject matter or of any exemplified term. Likewise, the disclosed subject matter is not limited to any particular preferred embodiments described herein. Indeed, many modifications and variations of the disclosed embodiments will be apparent to those skilled in the art upon reading this specification.

Example 1

Synthesis of Compounds

A. Hydrobromination of Vinyl-Terminated Atactic Polypropylene

To a solution of vinyl-terminated atactic vinyl-terminated atactic polypropylene (GPC $M_w$ 4789, $M_n$ 2289, $^1$H NMR Mn 1865.85 g/mol, 60.00 g, 32.16 mmol) in hexanes (50 ml) cooled to −10° C. was added dropwise a mixture of 33 wt % hydrogen bromide solution in acetic acid (11.25 ml, 56.25 mmol) and hexanes (10 ml) from an addition funnel over 15 min. After complete addition of the HBr solution, the mixture was stirred at between 0 to 10° C. for an additional 1.5 hour. Ice-cold water (100 ml) was added to the mixture and the aqueous phase was extracted with hexanes (30 ml). The organic extract was washed with water (2×150 ml), dried over $MgSO_4$, filtered and concentrated on a rotary evaporator to give a light yellow liquid as crude product. $^1$H NMR supported the assignment of a primary bromide structure. The crude product was further purified by heating at 60 to 65° C. under high vacuum to yield a light yellow clear liquid (59.65 g), which was characterized by GPC: $M_w$ 4544, $M_n$ 1978, and by elemental analyses: C, 82.06%; H, 13.84%; Br, 4.20%. This hydrobrominated polymer contains a bromine content of about 0.526 mmol/g.

B. Hydrobromination of Vinyl-Terminated Propylene/1-Butene Copolymer

To a solution of vinyl-terminated propylene/1-butene copolymer (GPC $M_w$ 2197, $M_n$ 1030, $^1$H NMR Mn 1062.16 g/mol, 40.00 g, 37.66 mmol) in hexanes (50 ml) cooled to −10° C. was added dropwise a mixture of 33 wt % hydrogen bromide solution in acetic acid (13.18 ml, 65.9 mmol) and hexanes (10 ml) from an addition funnel over 15 min. After complete addition of the HBr solution, the mixture was stirred at between 0 to 10° C. for an additional 1.75 hour. Ice-cold water (100 ml) was added to the mixture and the aqueous phase was extracted with hexanes (30 ml). The organic extract was washed with water (2×150 ml), dried over $MgSO_4$, filtered and concentrated on a rotary evaporator to give a light yellow liquid as crude product. $^1$H NMR supported the assignment of a primary bromide structure. The crude product was further purified by heating at 60 to 65° C. under high vacuum to yield a light yellow clear liquid (40.90 g), which was characterized by GPC: $M_w$ 2039, $M_n$ 924, and by elemental analyses: C, 78.83%; H, 13.39%; Br, 7.55%. This hydrobominated polymer contains a bromine content of about 0.945 mmol/g.

C. Nucleophilic Substitution of Bromine-Containing Polypropylene with Tetraethylenepentamine To a solution of tetraethylenepentamine (0.896 g, 4.73 mmol) in tetrahydrofuran (8 ml) in a two-neck round-bottomed flask was added dropwise a solution of bromine-containing polypropylene (3.00 g, from Example 1.A, 1.58 mmol of bromine) in THF (12 ml) at room temperature. The resulting mixture was heated in an oil bath at 77° C. for 18 hours under a nitrogen atmosphere. The cloudy mixture was cooled to about 40° C. and a solution of sodium hydroxide (0.126 g, 3.15 mmol) in methanol (2 ml) was added to the mixture. The mixture turned clear and the resulting mixture was heated to 80° C. for 5.5 hours under a nitrogen atmosphere. A white precipitate formed and the solution was decanted. The solvent was removed on a rotary evaporator. The oily residue was dissolved in diethyl ether, washed with water and brine, dried over $Na_2SO_4$ and filtered. The solvent was removed on a rotary evaporator and the crude product was heated under high vacuum to afford a colorless viscous product (2.60 g), which was characterized by elemental analysis to have 79.64% C, 13.85% H, and 2.69% N.

D. Nucleophilic Substitution of Bromine-Containing Propylene/1-Butene Copolymer with Diethylenetriamine To a solution of bromine-containing propylene/1-butene copolymer (3.09 g, from Example 1.B, 2.92 mmol of bromine) in THF (15 ml) at room temperature was added dropwise a solution of diethylenetriamine (1.81 g, 17.52 mmol) in THF (5 ml). The mixture was heated at 65° C. for 24 hours under a nitrogen atmosphere. A solution of sodium hydroxide (0.19 g, 4.75 mmol) in methanol (3.2 ml) was added to the mixture and heating was continued at 80° C. for an additional 5.5 hours. The mixture was cooled to room temperature and the aqueous phase was extracted with ether (45 ml). The organic extract was washed with water and brine, dried over $MgSO_4$, filtered and concentrated on a rotary evaporator to give a pale yellow viscous oily product (2.75 g).

Example 2

Fouling Reduction Measured in the Alcor HLPS (Hot Liquid Process Simulator)

Figure 2:
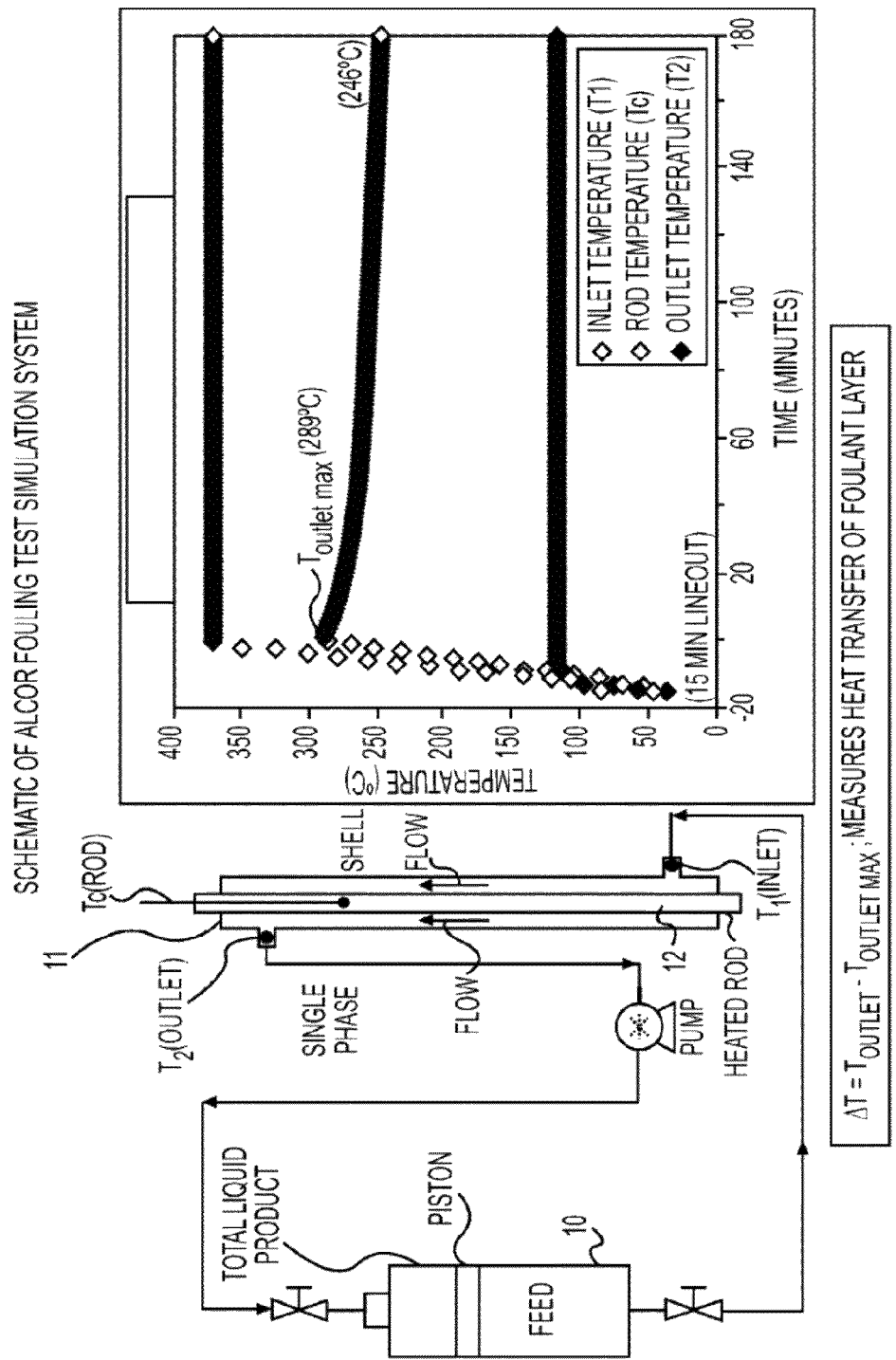
FIG. 2 is a schematic of the Alcor Hot Liquid Process Simulator (HLPS) employed in Example 2 of this application.

FIG. 2 depicts an Alcor HLPS (Hot Liquid Process Simulator) testing apparatus used to measure the impact of addition of particulates to a crude oil on fouling and the impact the addition of an additive of the disclosed subject matter has on the mitigation of fouling. The testing arrangement includes a reservoir 10 containing a feed supply of crude oil. The feed supply of crude oil can contain a base crude oil containing a whole crude or a blended crude containing two or more crude oils. The feed supply is heated to a temperature of approximately 150° C./302° F. and then fed into a shell 11 containing a vertically oriented heated rod 12. The heated rod 12 is formed from carbon-steel (1018). The heated rod 12 simulates a tube in a heat exchanger. The heated rod 12 is electrically heated to a surface temperature of 370° C./698° F. or 400° C./752° F. and maintained at such temperature during the trial. The feed supply is pumped across the heated rod 12 at a flow rate of approximately 3.0 mL/minute. The spent feed supply is collected in the top section of the reservoir 10. The spent feed supply is separated from the untreated feed supply oil by a sealed piston, thereby allowing for once-through operation. The system is pressurized with nitrogen (400-500 psig) to ensure gases remain dissolved in the oil during the test. Thermocouple readings are recorded for the bulk fluid inlet and outlet temperatures and for surface of the rod 12.

During the constant surface temperature testing, foulant deposits and builds up on the heated surface. The foulant deposits are thermally degraded to coke. The coke deposits cause an insulating effect that reduces the efficiency and/or ability of the surface to heat the oil passing over it. The resulting reduction in outlet bulk fluid temperature continues over time as fouling continues. This reduction in temperature is referred to as the outlet liquid $\Delta T$ or $\Delta T$ and can be dependent on the type of crude oil/blend, testing conditions and/or other effects, such as the presence of salts, sediment or other fouling promoting materials. A standard Alcor fouling test is carried out for 180 minutes. The total fouling, as measured by the total reduction in outlet liquid temperature over time, is plotted on the y-axis of FIG. 3 and is the observed outlet temperature ($T_{outlet}$) minus the maximum observed outlet $T_{outlet\,max}$ (presumably achieved in the absence of any fouling).

Figure 3:
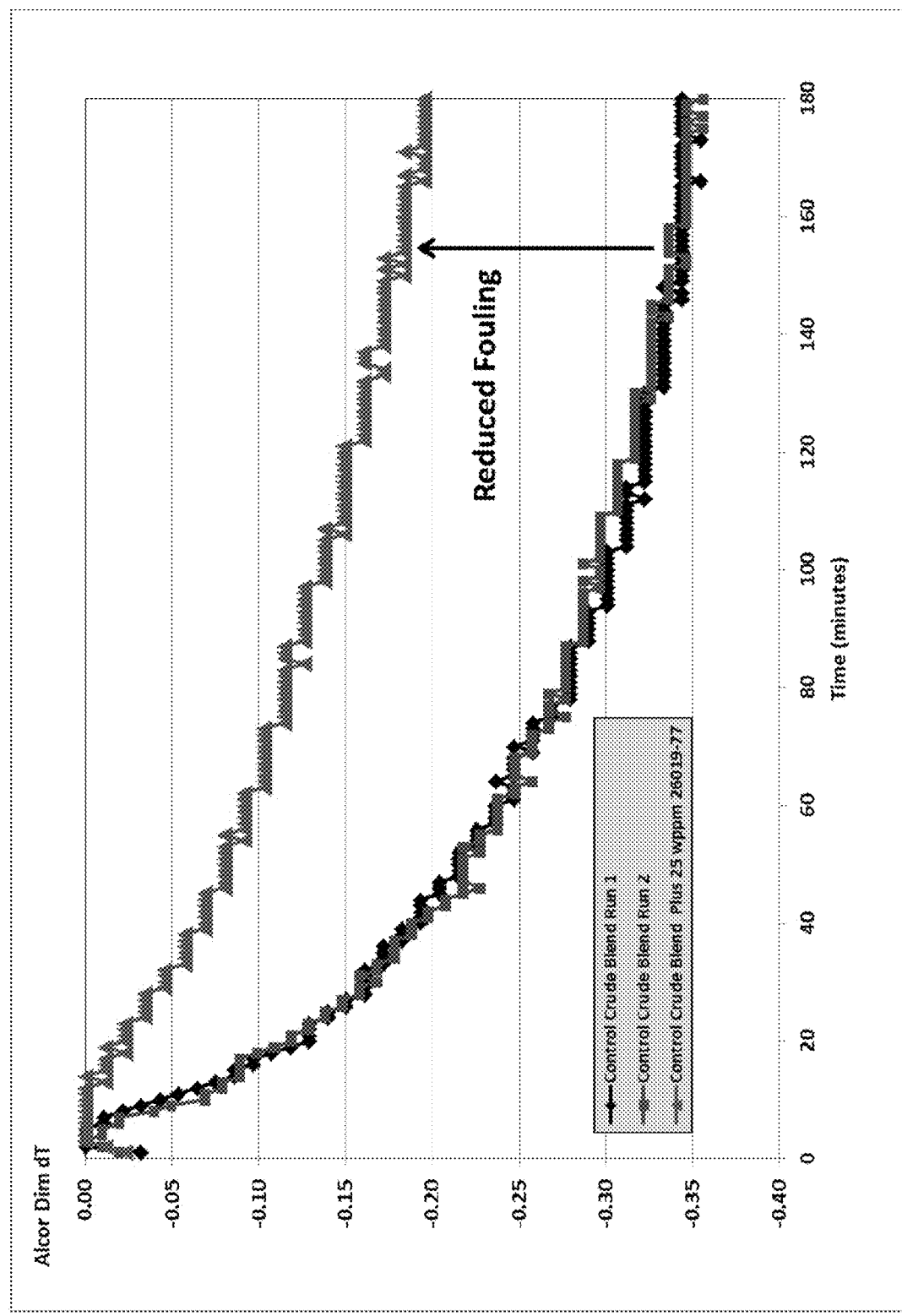
FIG. 3 is a graph demonstrating the effects of fouling of a control crude oil blend sample and a crude oil blend sample treated with 25 wppm of an additive according to the disclosed subject matter, as measured by the Alcor HLPS apparatus depicted in FIG. 2.

FIG. 3 illustrates the impact of fouling of a refinery component over 180 minutes. Two blends were tested in the Alcor unit: a crude oil control containing added rust (iron oxide) particles (200 wppm) without an additive, and the same stream with 25 wppm of the additive prepared according to the method in Example 1.0 above. As FIG. 3 demonstrates, the reduction in the outlet temperature over time (due to fouling) is less for the process blend containing 25 wppm of additive as compared to the crude oil control without the additive. This indicates that the additive is effective at reducing fouling of a heat exchanger.

ADDITIONAL EMBODIMENTS

Additionally or alternatively, the disclosed subject matter can include one or more of the following embodiments.

Embodiment 1

A compound represented by

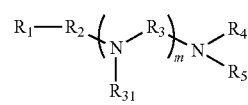

wherein $R_1$ is a branched or straight-chained $C_{10}$-$C_{800}$ alkyl or alkenyl group; m is an integer between 0 and 10 inclusive; $R_2$ is represented by

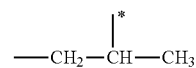

or —$CH_2$—$CH_2$—$CH_2$—*, wherein the asterisk (*) indicates a connecting point of $R_2$ with the nitrogen that connects with $R_3$; $R_3$ is a $C_1$-$C_4$ branched or straight chained alkylene group; $R_{31}$ is hydrogen or —$R_8$-$R_9$, wherein $R_8$ is defined the same as $R_2$ above, and $R_9$ is branched or straight-chained $C_{10}$-$C_{800}$ alkyl or alkenyl group, or $R_8$ and $R_9$ together are a $C_1$-$C_4$ branched or straight chained alkyl group optionally substituted with one or more amine groups; and further wherein the —$N(R_{31})$—$R_3$-repeat unit is optionally interrupted in one or more places by a nitrogen-containing heterocyclic cycloalkyl group; and $R_4$ and $R_5$ are each independently selected from (a) hydrogen, (b) —$R_6$-$R_7$, wherein $R_6$ is defined the same as $R_2$ above, and $R_7$ is a $C_{10}$-$C_{800}$ branched or straight chained alkyl or alkenyl group, or (c) a bond connected to $R_{31}$ in the m-th —$N(R_{31})$—$R_3$— repeat unit.

Embodiment 2

The compound of Embodiment 1, wherein at least one of $R_1$, $R_7$, and $R_9$ comprises polypropylene.

Embodiment 3

The compound of Embodiment 2, wherein the polypropylene is atactic polypropylene, isotactic polypropylene, or syndiotactic polypropylene.

Embodiment 4

The compound of Embodiment 2, wherein the polypropylene is amorphous.

Embodiment 5

The compound of Embodiment 2, wherein the polypropylene includes isotactic or syndiotactic crystallizable units.

Embodiment 6

The compound of Embodiment 2, wherein the polypropylene includes meso diads constituting from about 30% to about 99.5% of the total diads of the polypropylene.

Embodiment 7

The compound of Embodiment 2, wherein at least one of $R_1$, $R_7$, and $R_9$ has a number-averaged molecular weight of from about 300 to about 30000 g/mol.

Embodiment 8

The compound of Embodiment 7, wherein at least one of $R_1$, $R_7$, and $R_9$ has a number-averaged molecular weight of from about 500 to about 5000 g/mol.

Embodiment 9

The compound of Embodiment 1, wherein at least one of $R_1$, $R_7$, and $R_9$ comprises polyethylene.

Embodiment 10

The compound of Embodiment 1, wherein at least one of $R_1$, $R_7$, and $R_9$ comprises poly(ethylene-co-propylene).

Embodiment 11

The compound of Embodiment 10, wherein at least one of $R_1$, $R_7$, and $R_9$ comprises from about 1 mole % to about 90 mole % of ethylene units and from about 99 mole % to about 10 mole % propylene units.

Embodiment 12

The compound of Embodiment 11, wherein at least one of $R_1$, $R_7$, and $R_9$ comprises from about 10 mole % to about 50 mole % of ethylene units.

Embodiment 13

The compound of Embodiment 1, wherein at least one of $R_1$, $R_7$, and $R_9$ comprises poly(higher alpha-olefin), the higher alpha-olefin including two or more carbon atoms on each side chain.

Embodiment 14

The compound of Embodiment 1, wherein at least one of $R_1$, $R_7$, and $R_9$ comprises poly(propylene-co-higher alpha-olefin), the higher alpha-olefin including two or more carbon atoms on each side chain.

Embodiment 15

The compound of Embodiment 1, wherein the nitrogen content in the additive is about 1 wt % to about 10 wt % based on the total weight of the additive.

Embodiment 16

The compound of Embodiment 1, wherein $R_3$ is —$CH_2$—$CH_2$—, and $R_{31}$ is hydrogen.

Embodiment 17

The compound of Embodiment 16, wherein the —$N(R_{31})$—$R_3$— repeat unit is interrupted in one or more places by a 1,4-diethylenediamine ring.

Embodiment 18

A method for preparing a compound, comprising: (a) converting a polymer base unit $R_{11}$ which is a branched or straight-chained $C_{10}$-$C_{800}$ alkyl or alkenyl group having a vinyl terminal group, to a polymer having a halogen terminal group; (b) reacting the polymer having the halogen terminal group obtained in (a) with a polyamine represented by

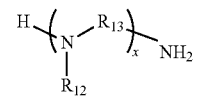

to form an amine hydrogen halide salt, wherein $R_{12}$ is hydrogen or a $C_1$-$C_4$ branched or straight chained alkyl optionally substituted with one or more amine groups, $R_{13}$ is a $C_1$-$C_4$ branched or straight chained alkylene group, and x is an integer between 1 and 10, and further wherein the —$N(R_{12})$—$R_{13}$— unit is optionally interrupted in one or more places by a nitrogen-containing heterocyclic cycloalkyl group, and wherein when the x-th —$N(R_{12})$—$R_{13}$-unit along with the terminal nitrogen atom forms a heterocyclic cycloalkyl group, the terminal —$NH_2$ is replaced by a —NH— group for valency; and (c) neutralizing the amine hydrogen halide salt with a base to liberate a free amine product.

Embodiment 19

The method of Embodiment 18, wherein $R_{11}$ comprises polypropylene.

Embodiment 20

The method of Embodiment 19, wherein the polypropylene is atactic polypropylene, isotactic polypropylene, or syndiotactic polypropylene.

Embodiment 21

The method of Embodiment 19, wherein the polypropylene is amorphous.

Embodiment 22

The method of Embodiment 19, wherein the polypropylene includes isotactic or syndiotactic crystallizable units.

Embodiment 23

The method of Embodiment 19, wherein the polypropylene includes meso diads constituting from about 30% to about 99.5% of the total diads of the polypropylene.

Embodiment 24

The method of Embodiment 18, wherein the molar ratio of $R_{11}$:polyamine is between about 5:1 and about 1:1.

Embodiment 25

The method of Embodiment 18, wherein $R_{11}$ has a number-averaged molecular weight of from about 300 to about 30000 g/mol.

Embodiment 26

The method of Embodiment 25, wherein $R_{11}$ has a number-averaged molecular weight of from about 500 to about 5000 g/mol.

Embodiment 27

The method of Embodiment 18, wherein $R_{11}$ comprises polyethylene.

Embodiment 28

The method of Embodiment 18, wherein $R_{11}$ comprises poly(ethylene-co-propylene).

Embodiment 29

The method of Embodiment 18, wherein $R_{11}$ comprises from about 10 mole % to about 90 mole % of ethylene units and from about 90 mole % to about 10 mole % propylene units.

Embodiment 30

The method of Embodiment 29, wherein $R_{11}$ comprises from about 20 mole % to about 50 mole % of ethylene units.

Embodiment 31

The method of Embodiment 18, wherein $R_{11}$ comprises poly(higher alpha-olefin), the higher alpha-olefin including two or more carbon atoms on each side chain.

Embodiment 32

The method of Embodiment 18, wherein $R_{11}$ comprises polypropylene-co-higher alpha-olefin), the higher alpha-olefin including two or more carbon atoms on each side chain.

Embodiment 33

The method of Embodiment 18, wherein $R_{11}$ comprises poly(ethylene-co-higher alpha-olefin), the higher alpha-olefin including two or more carbon atoms on each side chain.

Embodiment 34

The method of Embodiment 18, wherein at least 50% of the terminal vinyl groups of $R_{11}$ are an allylic vinyl group.

Embodiment 35

The method of Embodiment 18, wherein the polyamine comprises linear, branched or cyclic isomers of an oligomer of ethyleneamine, or mixtures thereof, wherein each two neighboring nitrogens in the oligomer of ethyleneamine are bridged by one or two ethyleneamine groups.

Embodiment 36

The method of Embodiment 35, wherein the polyamine is selected from ethylenediamine, diethylenetriamine, triethylenetetramine, tetraethylenepentamine, pentaethylenehexamine, hexaethyleneheptamine, and mixtures thereof.

Embodiment 37

The method of Embodiment 18, wherein the polyamine comprises a heavy polyamine

Embodiment 38

The method of Embodiment 18, wherein (a) comprises reacting the polymer having the terminal vinyl group with hydrogen bromide.

Embodiment 39

The method of Embodiment 38, wherein the reaction in (a) is performed using a radical initiator.

Embodiment 40

The method of Embodiment 18, wherein the reaction in (b) is performed in the presence of a base.

Embodiment 41

The method of Embodiment 18, wherein the base is sodium hydroxide.

Embodiment 42

A compound produced by the method of any of Embodiments 18-41.

Embodiment 43

A method for reducing fouling in a hydrocarbon refining process comprising providing a crude hydrocarbon for a refining process; adding an additive to the crude hydrocarbon, the additive being represented by the compound of any of Embodiments 1-17.

Embodiment 44

A method for reducing fouling in a hydrocarbon refining process comprising providing a crude hydrocarbon for a refining process; and adding an additive to the crude hydrocarbon, the additive being prepared by the method of any of Embodiments 18-41.

Embodiment 45

A system for refining hydrocarbons comprising: at least one crude hydrocarbon refinery component; and crude hydrocarbon in fluid communication with the at least one crude hydrocarbon refinery component, the crude hydrocarbon comprising an additive represented by the compound of any of Embodiments 1-17.

Embodiment 46

The system of Embodiment 45, wherein the at least one crude hydrocarbon refinery component is selected from a heat exchanger, a furnace, a crude preheater, a coker preheater, a FCC slurry bottom, a debutanizer exchanger, a debutanizer tower, a feed/effluent exchanger, a furnace air preheater, a flare compressor component, a steam cracker, a steam reformer, a distillation column, a fractionation column, a scrubber, a reactor, a liquid-jacketed tank, a pipestill, a coker, and a visbreaker.

The disclosed subject matter is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims It is further to be understood that all values are approximate, and are provided for description.

Patents, patent applications, publications, product descriptions, and protocols are cited throughout this application, the disclosures of each of which is incorporated herein by reference in its entirety for all purposes.

The invention claimed is:

1. A method for reducing fouling in a hydrocarbon refining process comprising
providing a crude hydrocarbon for a refining process;
adding an additive to the crude hydrocarbon, the additive being represented by

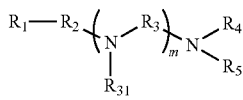

wherein $R_1$ is a branched or straight-chained $C_{10}$-$C_{800}$ alkyl or alkenyl group;

m is an integer between 0 and 10 inclusive;

$R_2$ is represented by

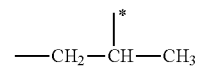

or $CH_2$—$CH_2$—$CH_2$—*, wherein the asterisk (*) indicates a connecting point of $R_2$ with the nitrogen that connects with $R_3$;

$R_3$ is a $C_1$-$C_4$ branched or straight chained alkylene group;

$R_{31}$ is hydrogen or —$R_8$-$R_9$, wherein $R_8$ is defined the same as $R_2$ above, and $R_9$ is branched or straight-chained $C_{10}$-$C_{800}$ alkyl or alkenyl group, or $R_8$ and $R_9$ together are a $C_1$-$C_4$ branched or straight chained alkyl group optionally substituted with one or more amine groups;

and further wherein the —$N(R_{31})$—$R_3$— repeat unit is optionally interrupted in one or more places by a nitrogen-containing heterocyclic cycloalkyl group;

$R_4$ and $R_5$ are each independently selected from (a) hydrogen, (b) —$R_6$-$R_7$, wherein $R_6$ is defined the same as $R_2$ above, and $R_7$ is a $C_{10}$-$C_{800}$ branched or straight chained alkyl or alkenyl group, or (c) a bond connected to $R_{31}$ in the m-th-$N(R_{31})$—$R_3$— repeat unit; and wherein at least one of $R_1$, $R_7$, and $R_9$ comprises poly (ethylene-co-propylene), and wherein the at least one of $R_1$, $R_7$, and $R_9$ comprises from about 1 mole % to about 90 mole % of ethylene units and from about 99 mole % to about 10 mole % propylene units.

2. The method of claim 1, wherein at least one of $R_1$, $R_7$, and $R_9$ comprises from about 10 mole %) to about 50 mole % of ethylene units.

3. The method of claim 1, wherein the nitrogen content in the additive is about 1 wt % to about 10 wt % based on the total weight of the additive.

4. The method of claim 1, wherein $R_3$ is —$CH_2$—$CH_2$—, and $R_{31}$ is hydrogen.

5. The method of claim 4, wherein the —$N(R_{31})$—$R_3$— repeat unit is interrupted in one or more places by a 1,4-diethylenediamine ring.

* * * * *